United States Patent
Kawai et al.

(10) Patent No.: US 9,899,893 B2
(45) Date of Patent: Feb. 20, 2018

(54) ELECTRIC MOTOR INCLUDING TERMINAL FORMED BY ELECTRIC SWAGING AND ELECTRIC SWAGING METHOD

(71) Applicant: FANUC CORPORATION, Yamanashi (JP)

(72) Inventors: Yasuo Kawai, Yamanashi (JP); Hidetoshi Uematsu, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 205 days.

(21) Appl. No.: 14/851,516

(22) Filed: Sep. 11, 2015

(65) Prior Publication Data

US 2016/0087506 A1 Mar. 24, 2016

(30) Foreign Application Priority Data

Sep. 18, 2014 (JP) .................................. 2014-190148

(51) Int. Cl.
*H02K 5/22* (2006.01)
*H02K 15/00* (2006.01)

(52) U.S. Cl.
CPC ......... *H02K 5/225* (2013.01); *H02K 15/0068* (2013.01)

(58) Field of Classification Search
CPC ................................ H02K 5/22; H02K 15/04
USPC .......................................................... 310/71
See application file for complete search history.

(56) References Cited

U.S. PATENT DOCUMENTS

| 6,565,378 | B1 | 5/2003 | Sawayanagi et al. | |
| 2011/0001373 | A1* | 1/2011 | Mori | H02K 3/28 310/71 |
| 2011/0012472 | A1* | 1/2011 | Umeda | H02K 3/28 310/207 |
| 2013/0014381 | A1* | 1/2013 | Kayukawa | H02K 3/28 29/596 |
| 2014/0102785 | A1 | 4/2014 | Miyamoto et al. | |
| 2014/0319942 | A1* | 10/2014 | Nakayama | H02K 15/0435 310/71 |

(Continued)

FOREIGN PATENT DOCUMENTS

| EP | 2575241 A2 | 4/2013 |
| JP | H1012289 A | 1/1998 |
| JP | 1140310 A | 2/1999 |

(Continued)

OTHER PUBLICATIONS

Untranslated Decision to Grant a Patent mailed by Japan Patent Office (JPO) for Application No. JP 2014-190148 dated Oct. 25, 2016, 3 pages.

(Continued)

*Primary Examiner* — Forrest M Phillips
(74) *Attorney, Agent, or Firm* — Fredrikson & Bryon, P.A.

(57) ABSTRACT

An electric motor includes a connector unit connected to a terminal attached to the end of a winding wire by electric swaging. The terminal includes a tube portion in which the end of the winding wire is inserted and which is formed by electric swaging. The length of the tube portion in a first direction within a plane perpendicular to the direction in which the winding wire is inserted is nearly equal to the length in a second direction perpendicular to the first direction.

1 Claim, 6 Drawing Sheets

(56) References Cited

U.S. PATENT DOCUMENTS

2015/0187462 A1* 7/2015 Kondo .................. H01R 4/023
                                                    310/71

FOREIGN PATENT DOCUMENTS

| JP | 2001326053 A | 11/2001 |
| JP | 2012202732 A | 10/2012 |
| JP | 2013219900 A | 10/2013 |
| JP | 2014164941 A | 9/2014 |
| WO | 2013015076 A1 | 1/2013 |

OTHER PUBLICATIONS

English machine translation of Decision to Grant a Patent mailed by JPO for Application No. JP 2014-190148 dated Oct. 25, 2016, 3 pages.
Untranslated Decision of Refusal mailed by Japan Patent Office (JPO) for Application No. JP 2014-190148, dated Jun. 7, 2016, 5 pages.
English machine translation of Decision of Refusal mailed by Japan Patent Office (JPO) for Application No. JP 2014-190148, dated Jun. 7, 2016, 5 pages.
Untranslated Notification of Reasons for Refusal mailed by Japan Patent Office (JPO) for JP 2014-190148, dated Jan. 5, 2016, 3 pages.
English machine translation of Notification of Reasons for Refusal mailed by Japan Patent Office (JPO) for Application No. JP 2014-190148, dated Jan. 5, 2016, 3 pages.
English Abstract and Machine Translation for Japanese Publication No. 2013219900 A, published Oct. 24, 2013, 13 pgs.
English Abstract and Machine Translation for Japanese Publication No. 2012202732 A, published Oct. 22, 2012, 18pgs.
English Abstract and Machine Translation for Japanese Publication No. JPH1140310 A, published Feb. 12, 1999, 7 pgs.
English Translation of Japanese Publication No. 2014164941, published Sep. 8, 2014, 13 pages.
English Translation of Japanese Publication No. 2001326053, published Nov. 22, 2001, 7 pages.
English Translation of Japanese Publication No. H1012289, published Jan. 16, 1998, 9 pages.

* cited by examiner

ELECTRIC MOTOR INCLUDING TERMINAL FORMED BY ELECTRIC SWAGING AND ELECTRIC SWAGING METHOD

BACKGROUND OF THE INVENTION

1. Field of the Invention

The present invention relates to an electric motor including a terminal formed by electric swaging and an electric swaging method.

2. Description of the Related Art

In one known conventional apparatus, while a plurality of electric wires are inserted into a cylindrical terminal, the terminal is held by a pair of electrodes. The terminal is pressurized while a current is supplied to the pair of electrodes in order to attach the terminal to the ends of the electric wires by electric swaging (see, for example, Japanese Laid-open Patent Publication No. 2012-202732). The terminal formed by electric swaging has a flat shape and is elongated in one direction. Hence, when a plurality of terminals formed by electric swaging are connected to a connector or terminal board for an electric motor, the terminals may interfere with each other. An electric motor including a connector or terminal board provided with a plurality of terminals oriented in the same direction is known for preventing such interference between the terminals (see, for example, Japanese Laid-open Patent Publication No. 2013-219900).

However, in the electric motor described in Japanese Laid-open Patent Publication No. 2013-219900, the connector or terminal board connected to the terminals formed by electric swaging preferably has a specific shape, thus resulting in an increase in cost.

SUMMARY OF INVENTION

In an exemplary aspect, the present invention provides an electric motor including a connector unit connected to a terminal attached to the end of a winding wire by electric swaging. The terminal includes a tube portion in which the end of the winding wire is inserted and which is formed by electric swaging. The tube portion has a shape in which the length of in a first direction within a plane perpendicular to the direction in which the winding wire is inserted is nearly equal to the length in a second direction perpendicular to the first direction.

In another exemplary aspect, the present invention provides an electric swaging method of attaching a terminal which is connected to a connector unit for an electric motor and includes a tube portion in which the end of a winding wire is inserted into the end of the winding wire by electric swaging. In the electric swaging method, while the end of the winding wire is inserted into the tube portion of the terminal, the tube portion is placed in an interspace between a pair of electrodes spaced apart from each other in a first direction within a plane perpendicular to the direction in which the winding wire is inserted and a pair of pressing units spaced apart from each other in a second direction perpendicular to the first direction within the plane perpendicular to the direction in which the winding wire is inserted. At least one of the pair of electrodes is moved in the first direction to clamp the tube portion and at least one of the pair of pressing units is moved in the second direction to clamp the tube portion. While supplying a current to the pair of electrodes, at least one of the pair of electrodes is moved in the first direction and at least one of the pair of pressing units is moved in the second direction so as to make the length of the interspace in the first direction nearly equal to the length of the interspace in the second direction, thereby pressing the tube portion and attaching the terminal to the end of the winding wire.

BRIEF DESCRIPTION OF THE DRAWINGS

The above and other objects, features, and advantages of the present invention will be more apparent from the following description of embodiments when taken in conjunction with the accompanying drawings, in which.

DETAILED DESCRIPTION

Figure 1:
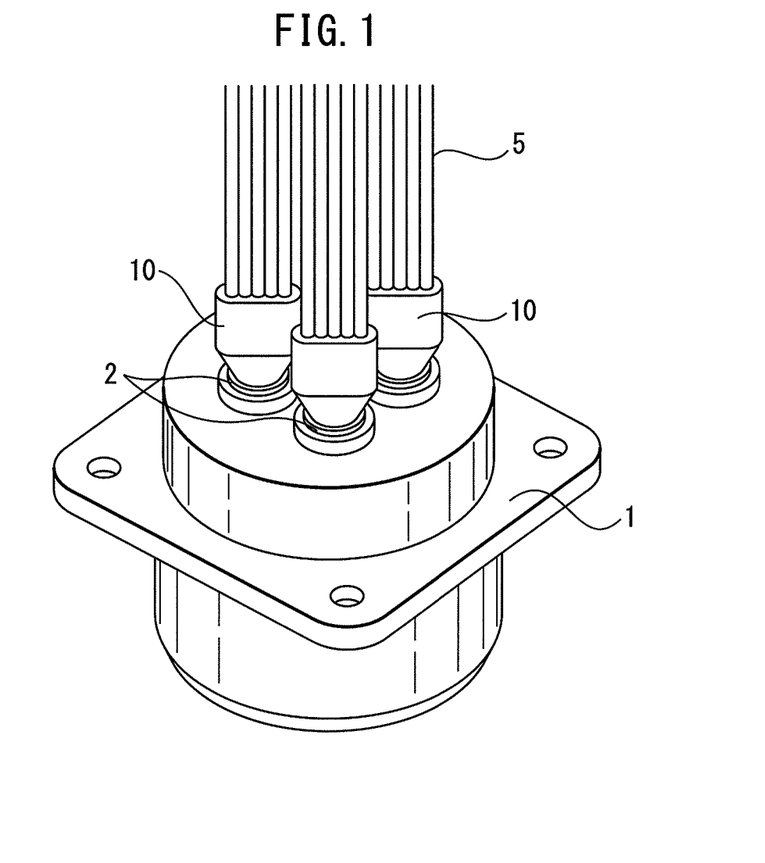
FIG. 1 is a perspective view illustrating an exemplary connector mounted in an electric motor according to an embodiment of the present invention.

Embodiments of the present invention will be described below with reference to FIGS. 1 to 8. An electric motor according to an embodiment of the present invention includes a connector unit (for example, a connector and a terminal board) connected to terminals. FIG. 1 is a perspective view illustrating an exemplary connector 1 mounted in an electric motor according to the embodiment of the present invention. The connector 1 includes a plurality of pins which project in the direction in which they fit into a counterpart connector, and are electrically connected to the counterpart connector. However, since the connector 1 is viewed from the opposite side of the pins in FIG. 1, the pins are not illustrated.

A plurality of recessed solder cups 2 are formed in the end face of the connector 1 and a plurality of terminals 10 are soldered to the solder cups 2, as illustrated in FIG. 1. Each terminal 10 is integrated with the ends of a plurality of winding wires 5 wound about stator cores (not illustrated). The solder cups 2 are formed so as to be electrically connected to the proximal ends of the pins of the connector 1. With this arrangement, when the terminals 10 are soldered to the connector 1, the winding wires 5 and the pins are electrically connected to each other through the terminals 10. Thus, power can be externally supplied to the winding wires 5 through the connector 1.

Figure 2:
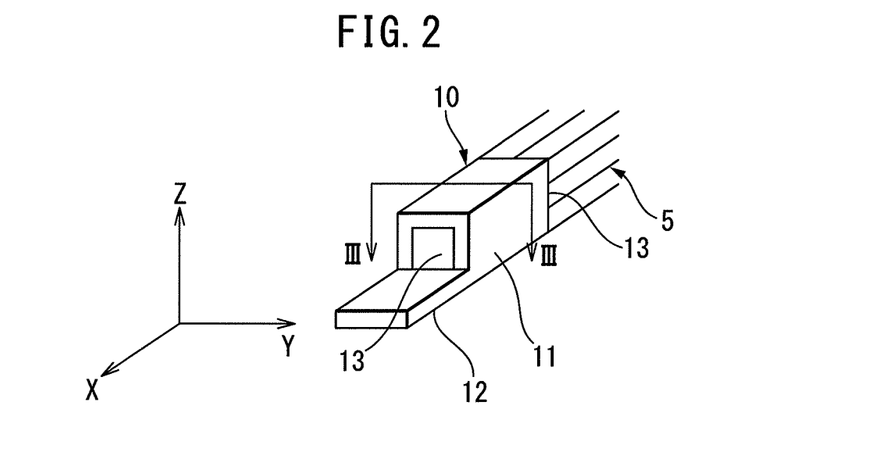
FIG. 2 is a perspective view illustrating a terminal bonded to the connector depicted as FIG. 1.

FIG. 2 is a perspective view illustrating the terminal 10 attached to the ends of the winding wires 5. Three orthogonal axial directions (X-, Y-, and Z-directions) are defined as illustrated in FIG. 2, and a configuration of the terminal 10 will be described hereinafter in accordance with the definition. The terminal 10 includes a tube portion 11 which extends in the X-direction and accommodates the plurality of winding wires, and a connecting portion 12 extending in the X-direction from one end of the tube portion 11 in the X-direction, as illustrated in FIG. 2. The connecting portion 12 is inserted into the solder cup 2 of the connector 1 and soldered to the pin of the connector 1 by the solder cup 2. The tube portion 11 includes opening portions 13 at its both ends in the X-direction and the ends of the winding wires 5 are inserted into the tube portion 11 from the opening portion 13 opposite to the connecting portion 12. In this state, as will be described later, an electric swaging apparatus is used to attach the terminal 10 to the ends of the winding wires 5 by electric swaging of the terminal 10 and the winding wires 5.

Figure 3A:
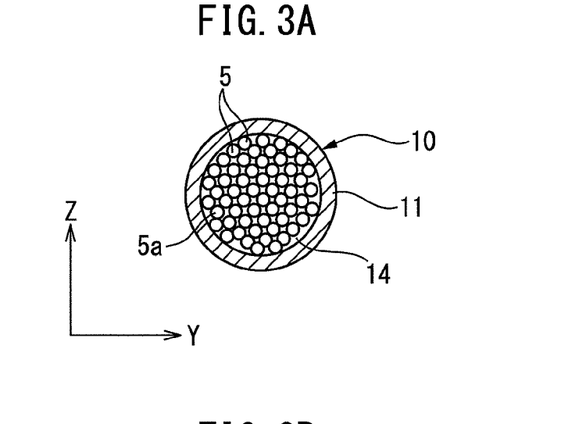
FIG. 3A is a cross-sectional view illustrating the terminal taken along a line III-III in FIG. 2, before electric swaging.
Figure 3B:
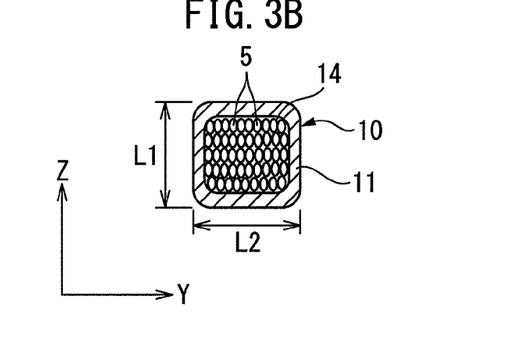
FIG. 3B is a cross-sectional view illustrating the terminal taken along the line III-III in FIG. 2, after electric swaging.

FIGS. 3A and 3B are cross-sectional views illustrating the terminal 10 taken along a line III-III in FIG. 2, i.e., views illustrating a configuration of the terminal 10 on the Y-Z plane that is perpendicular to the X-direction. Note that FIG. 3A illustrates the state before electric swaging and FIG. 3B illustrates the state after electric swaging. As illustrated in FIG. 3A, before electric swaging, the tube portion 11 of the terminal 10 has a cylindrical shape and the ends of the plurality of winding wires 5 are inserted into a space 14 in the tube portion 11. In this state, each winding wire 5 (copper wire) is covered with an insulating material 5a made of a resin. When the winding wires 5 are inserted, the space 14 includes voids. Thus, the plurality of winding wires 5 can be easily inserted into the space 14.

As illustrated in FIG. 3B, after electric swaging, the cross-sectional area of the tube portion 11 reduces to the degree that the tube portion 11 and the winding wires 5 in the space 14 have nearly no voids between them. Therefore, the winding wires 5 are in close contact with each other and the outer winding wires 5 are in close contact with the tube portion 11. In this state, the insulating materials 5a of the winding wires 5 are molten and the winding wires 5 are electrically connected to the tube portion 11.

In this embodiment, the tube portion 11 has a nearly square cross-section after electric swaging. In other words, a length L2 of the tube portion 11 in the Y-direction is equal to a length L1 of the tube portion 11 in the Z-direction. Making the tube portion 11 have equal lengths L1 and L2 in the Z- and Y-directions, respectively, which are orthogonal to each other in a plane perpendicular to the direction in which the winding wires 5 are inserted (X-direction) produces the following effects as described below.

Figure 4:
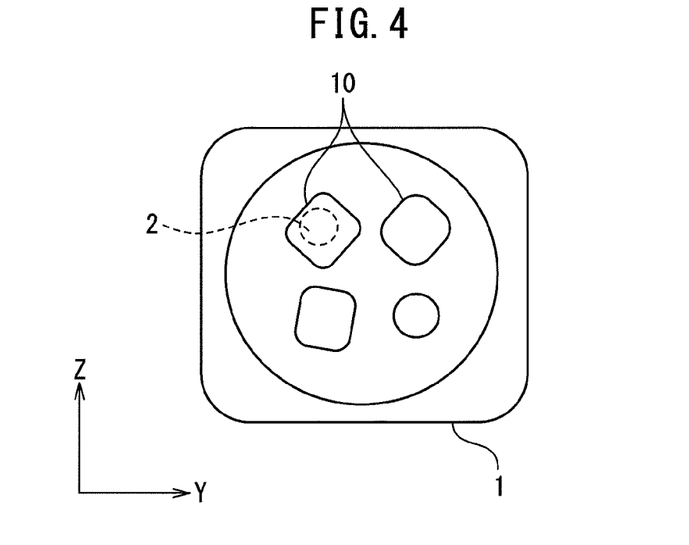
FIG. 4 is a plan view illustrating the connector when a plurality of terminals are arranged in it.
Figure 5A:
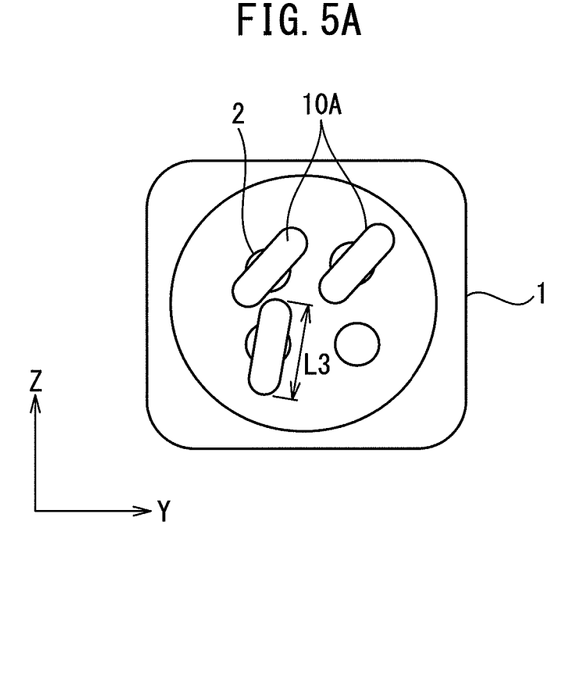
FIG. 5A is a plan view illustrating comparative example 1 to FIG. 4.
Figure 5B:
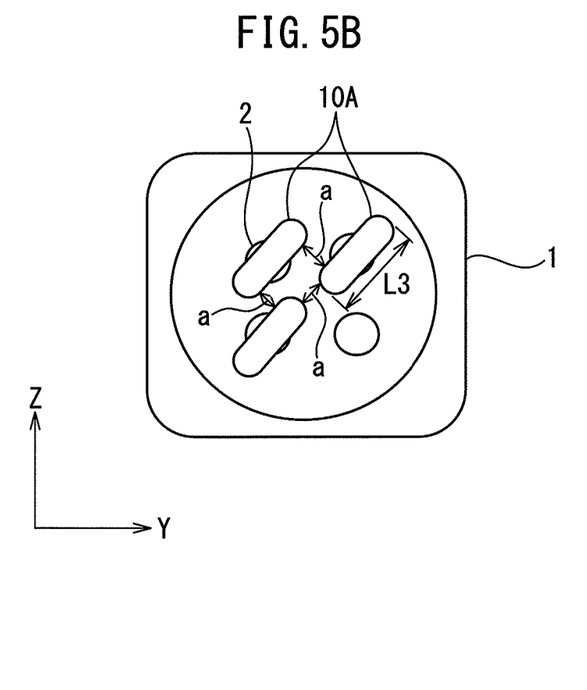
FIG. 5B is a plan view illustrating comparative example 2 to FIG. 4.

FIG. 4 is a plan view illustrating the arrangement of a plurality of (in Figure, three) terminals 10 soldered to the solder cups 2 of the connector 1. FIGS. 5A and 5B are views illustrating comparative examples to FIG. 4. The solder cups 2 are arranged at the same positions in FIGS. 4, 5A, and 5B. Terminals 10A shown in FIGS. 5A and 5B are formed by being crushed from one direction upon electric swaging. The terminal 10A has a flat cross-section and a length L3 of the flat portion (the maximum length of the terminal 10A in the Y-Z plane) after electric swaging is larger than the length before electric swaging. Thus, as illustrated in FIG. 5A, the plurality of terminals 10A may interfere with each other.

Referring to FIG. 5B, to prevent the terminals 10A and 10A from interfering with each other, the terminals 10A are soldered so as to the connector 1 to have the same orientation. However, in this case, a configuration for positioning the terminal 10A is necessary, thus resulting in an increase in cost. In addition, referring to FIG. 5B, portions "a" where the terminals 10A and 10A have narrow distances between them are formed. In the portions "a", it is difficult to ensure a sufficient insulation distance. In particular, as the diameter or number of winding wires 5 increases, the maximum length L3 of the terminal 10A in the Y-Z plane after electric swaging increases. This makes it more difficult to ensure a sufficient insulation distance between the terminals while preventing the terminals from interfering with each other. Since the distance and arrangement of pins of the connector 1 are defined based on, for example, standards or specifications, it is also difficult to ensure sufficient insulation distance by changing the positions of the solder cups 2.

In contrast to this, in this embodiment, since the terminal 10 has a nearly square cross-section, the maximum length of the terminal 10 in the Y-Z plane is small and the terminal 10 after electric swaging is compact. Therefore, as illustrated in FIG. 4, even when the terminals 10 are oriented in arbitrary directions, a sufficient insulation distance can be ensured between the terminals 10 and 10 without making the terminals 10 and 10 interfere with each other. In addition, since the terminal 10 can be made compact, the connector unit occupies only a small space. A relatively large space can be ensured between the terminals 10 and 10 and this facilitates soldering. Further, since a terminal 10 having a relatively large diameter can be used before electric swaging, it is easy to insert the ends of the winding wires 5 into the tube portion 11. Hence, automatic electric swaging can be optimally performed using, for example, a robot.

Figure 6:
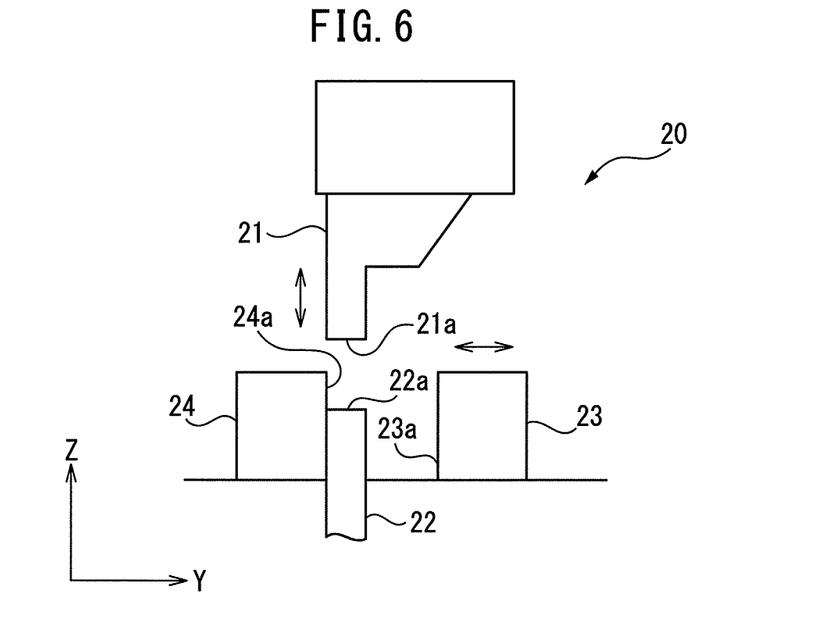
FIG. 6 is a view illustrating a configuration of an electric swaging apparatus according to an embodiment of the present invention.

An electric swaging method according to an embodiment of the present invention will be described next. In particular, a method of manufacturing terminals by electric swaging will be described. Electric swaging is performed using an electric swaging apparatus. FIG. 6 is a view illustrating a configuration of an electric swaging apparatus 20 according to an embodiment of the present invention. Note that FIG. 6 illustrates the configuration of the electric swaging apparatus 20 in the Y-Z plane. The electric swaging apparatus 20 includes a pair of electrodes (an upper electrode 21 and a lower electrode 22) spaced apart from each other in the Z-direction, and a pair of guides (a movable guide 23 and a stationary guide 24) spaced apart from each other in the Y-direction, as illustrated in FIG. 6. The guides 23 and 24 are made of a heat-resistant material such as ceramics. The guides 23 and 24 correspond to pressing units.

The upper electrode 21 is movable in the Z-direction. Movement of the upper electrode 21 changes the distance between an end face 21a of the upper electrode 21 and an end face 22a of the lower electrode 22. The end faces 21a and 22a are opposed to each other. The end faces 21a and 22a correspond to a pair of contact surfaces which come into contact with the outer peripheral surface of the tube portion. The movable guide 23 is formed so as to be movable in the Y-direction. Movement of the movable guide 23 changes the distance between an end face 23a of the movable guide 23 and an end face 24a of the stationary guide 24. The end faces 23a and 24a are opposed to each other. The end faces 23a and 24a correspond to a pair of contact surfaces which come into contact with the outer peripheral surface of the tube portion. The end faces 21a and 22a of the electrodes 21 and 22 and the end faces 23a and 24a of the guides 23 and 24 are formed to be flat.

Figure 7A:
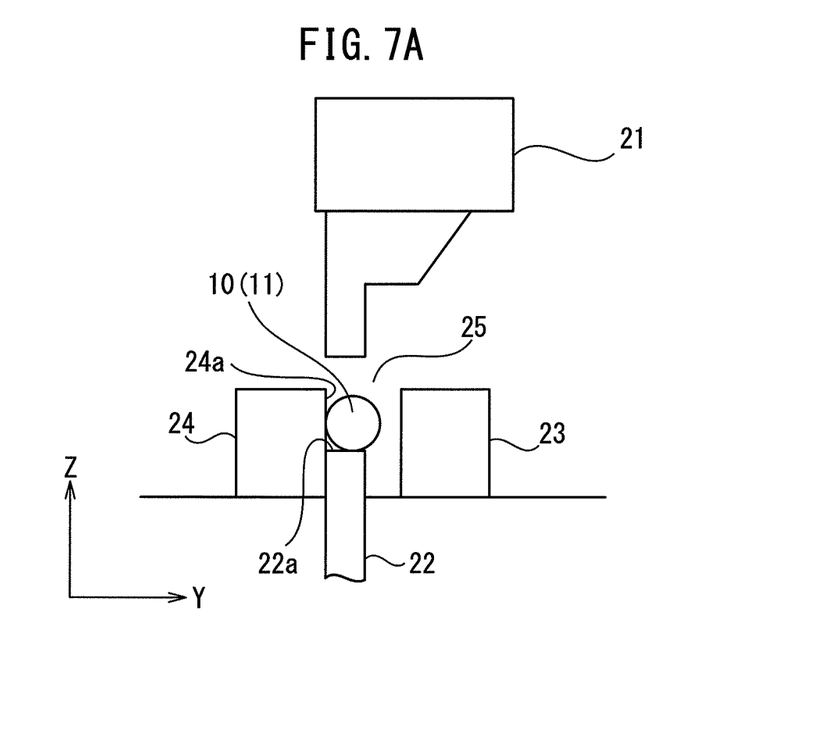
FIG. 7A is a view illustrating a procedure of an electric swaging method according to an embodiment of the present invention.
Figure 7B:
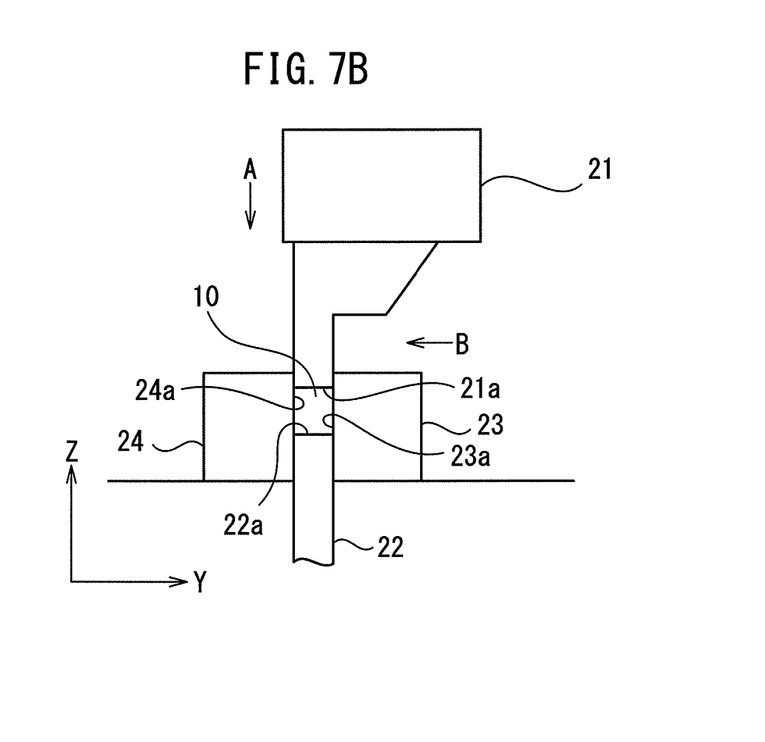
FIG. 7B is a view illustrating the procedure of the electric swaging method in a state continued from FIG. 7A.
Figure 7C:
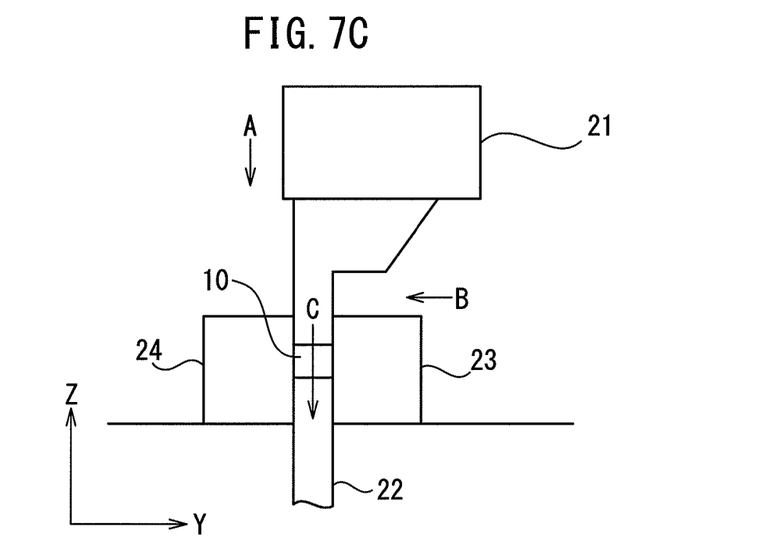
FIG. 7C is a view illustrating the procedure of the electric swaging method in a state continued from FIG. 7B.

FIGS. 7A to 7C are views illustrating a procedure of the electric swaging method according to an embodiment of the present invention. In electric swaging, first, the ends of winding wires 5 are inserted into a tube portion 11 of a cylindrical terminal 10. As illustrated in FIG. 7A, while the winding wires 5 are inserted in the tube portion 11, the terminal 10 is placed in an interspace 25 between a pair of electrodes 21 and 22 spaced apart from each other in the Z-direction and a pair of guides 23 and 24 spaced apart from each other in the Y-direction. For example, the terminal 10 is placed while the tube portion 11 is kept in contact with an end face 22a of the lower electrode 22 and an end face 24a of the stationary guide 24.

Then, as illustrated in FIG. 7B, the upper electrode 21 is moved in a direction indicated by an arrow A toward the terminal 10 and the movable guide 23 is moved in a direction indicated by an arrow B toward the terminal 10 to clamp the terminal 10 using the pair of electrodes 21 and 22 and the pair of guides 23 and 24. At this time, the outer peripheral surface of the terminal 10 abuts against the end faces 21a and 22a of the pair of the electrodes 21 and 22 and the end faces 23a and 24a of the pair of the guides 23 and 24, thereby being pressurized from four directions.

As illustrated in FIG. 7C, while electrifying the terminal 10 by supplying a current to the electrodes 21 and 22, the upper electrode 21 is moved in the direction A and the movable guide 23 is moved in the direction B until the terminal 10 has a predetermined length L2 in the Y-direction and a predetermined length L1 in the Z-direction (FIG. 3B). The movement of the upper electrode 21 and the movable guide 23 further pressurizes the terminal 10. In this embodiment, the upper electrode 21 and the movable guide 23 are moved so that the length of the interspace 25 in the Y-direction is nearly equal to the length of the interspace 25 in the Z-direction. At this time, a current is supplied in a direction indicated by an arrow C in FIG. 7C. The current heats and softens the terminal 10 and increases the temperature of the winding wires 5 through the terminal 10. This melts and pushes the insulating materials 5a (FIG. 3A) surrounding the winding wires 5 out of the tube portion 11 so that the terminal 10 and the winding wires 5 are electrically connected to each other. As a result, as illustrated in FIG. 3B, the cross-sectional area of the tube portion 11 of the terminal 10 is reduced and the terminal 10 has a nearly square cross-section in which the terminal 10 and the winding wires 5 are in close contact with each other. After electric swaging, the tube portion 11 is elongated in the X-direction by the amount of reduction in cross-sectional area of the tube portion 11.

As described above, in this embodiment, the terminal 10 is placed between the pair of electrodes 21 and 22 and the pair of guides 23 and 24. The electrode 21 and the guide 23 are moved toward the terminal 10 to pressurize the terminal 10 from four directions. The terminal 10 is further pressurized while being electrified by supplying a current to the electrodes 21 and 22. Thus, the terminal 10 in which length L2 in the Y-direction and length L1 in the Z-direction are equal each other can be formed.

When the terminal 10 is pressurized by the pair of electrodes 21 and 22 and the pair of guides 23 and 24, the electrode (upper electrode 21) and the guide (movable guide 23) may be driven simultaneously. However, one of the electrode 21 and the guide 23 may be driven first and the other of them may be driven subsequently. In this case, the electrode 21 is preferably driven first because driving the guide 23 first may hinder the electrode 21 from being smoothly inserted into the gap between the guides 23 and 24.

The cross-sectional shape of the terminal 10 after electric swaging is determined in conformity to the shapes of the end faces 21a and 22a of the electrodes 21 and 22 and the end faces 23a and 24a of the guides 23 and 24, which come into contact with the terminal 10. In this embodiment, since the end faces 21a, 22a, 23a, and 24a have a planar shape, the terminal 10 can be formed with a nearly square cross-section. Some or all of the end faces 21a, 22a, 23a, and 24a may have a curved shape (for example, an arc-shaped cross-section) in place of a planar shape.

Figure 8:
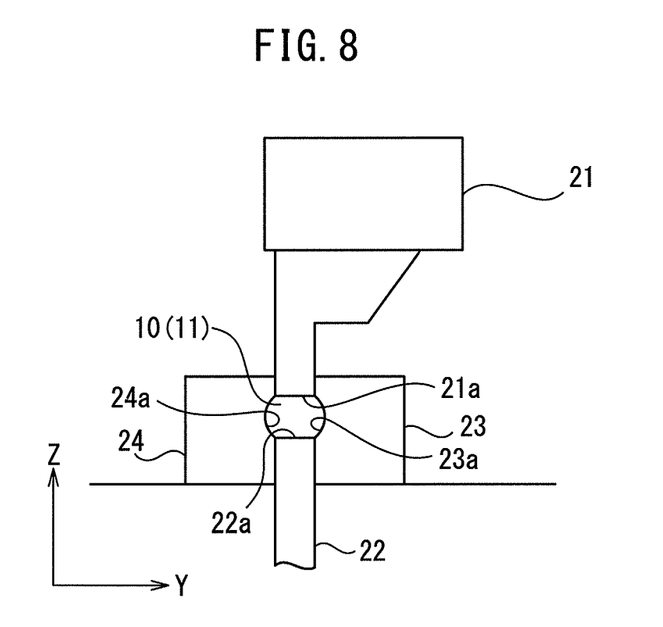
FIG. 8 is a view illustrating a modified example to FIG. 6.

FIG. 8 is a view illustrating a modified example to FIG. 6. Referring to FIG. 8, the end faces 23a and 24a of the guides 23 and 24 have arc-shaped cross-sections. Thus, part of the terminal 10 can be formed with an arc-shaped cross-section. In this case as well, the terminal 10 has equal lengths in the Y- and Z-directions after electric swaging. Not only the end faces 23a and 24a of the guides 23 and 24 but also the end faces 21a and 22a of the electrodes 21 and 22 may have arc-shaped cross-sections. This allows the terminal 10 to have a circular cross-section.

The cross-sectional shape of the terminal 10 is not limited to the above-mentioned examples as long as the terminal 10 is formed by electric swaging so as to make the tube portion 11 of the terminal 10 have equal lengths L1 and L2 in a first direction (Z-direction) within a plane (Y-Z plane) perpendicular to the direction in which the winding wires 5 are inserted (X-direction) and in a second direction (Y-direction) perpendicular to the first direction. The same effects as in this embodiment can be obtained as long as the length L1 in the first direction and the length L2 in the second direction are nearly equal to each other although not precisely equal to each other. Therefore, the configuration of the terminal 10 is not limited to the above-mentioned examples as long as the length L1 in the first direction and the length L2 in the second direction are nearly equal to each other. The terminal 10 may be formed with, for example, a regular polygonal cross-section or nearly regular polygonal cross-section other than a square cross-section. Alternatively, the terminal 10 may have a nearly circular cross-section.

In the above-described embodiments, although the upper electrode 21 is lowered to clamp the terminal 10 between the upper electrode 21 and the lower electrode 22, the configuration of a pair of electrodes movable in the first direction is not limited to this. For example, both the upper electrode 21 and the lower electrode 22 may be movable toward the terminal 10. In addition, in the above-described embodiments, although the movable guide 23 and the stationary guide 24 press the terminal 10 in the second direction, the configuration of the pressing units is not limited to this. For example, both the guides 23 and 24 may be movable toward the terminal 10. The terminal 10 formed by electric swaging is applied to the connector 1 for an electric motor in the above-described embodiments but may similarly be applied to other connector units for an electric motor such as a terminal board.

According to the present invention, the tube portion of each terminal is formed to have nearly equal lengths in a first direction within a plane perpendicular to the direction in which the winding wires are inserted and in a second direction perpendicular to the first direction. This makes it possible to prevent the terminals from interfering with each other without arranging them in one specific orientation, thus keeping the cost low.

The above description is merely an example, and the present invention is not limited to the above-described embodiments and modified example without departing from the features of the present invention. Elements of the above-described embodiments and modified example include replaceable or obviously replacement elements while maintaining the identity of the present invention. In other words, other embodiments possible within the scope of the technical idea of the present invention also fall within the scope of the present invention. In addition, the above-described embodiments can be arbitrarily combined with one or more modified example.

The invention claimed is:

1. An electric motor comprising a connector unit connected to a terminal attached to an end of a winding wire by electric swaging, wherein
   the terminal includes a tube portion and a connecting portion wherein only the connecting portion is inserted in the connector unit, the tube portion being where the end of the winding wire is inserted and which is formed by electric swaging; the tube portion has a shape in which a length in a first direction within a plane perpendicular to a direction in which the winding wire is inserted is nearly equal to a length in a second direction perpendicular to the first direction, and the tube portion has a square cross-sectional shape in the plane perpendicular to the direction in which the winding wire is inserted;
   a plurality of the terminals are situated close to each other and are fixed in irregular directions in the connector unit; and
   the plurality of the terminals are spaced apart from each other by an insulation distance that is sufficient no matter how the plurality of terminals are oriented with respect to each other.

* * * * *